United States Patent [19]

Grove et al.

[11] Patent Number: 5,104,141

[45] Date of Patent: Apr. 14, 1992

[54] ALIGNMENT DEVICE FOR DOUBLE ECCENTRIC CAM ARRANGEMENT

[75] Inventors: Clinton E. Grove; Robert D. Grove, both of Elbow Lake; James R. Ryshavy, Cologne, all of Minn.; Thomas G. Spears, Burr Ridge, Ill.

[73] Assignee: Northstar Manufacturing Company, Inc., Minnetonka, Minn.

[21] Appl. No.: 670,262

[22] Filed: Mar. 11, 1991

[51] Int. Cl.⁵ ............................................. B62D 17/00
[52] U.S. Cl. ................................. 280/661; 411/398; 411/424; 403/4; 403/409.1
[58] Field of Search ................ 280/661; D8/387; 411/398, 424, 169; 403/4, 409.1, DIG. 8, 162, 351

[56] References Cited

U.S. PATENT DOCUMENTS

| | | | |
|---|---|---|---|
| 2,123,089 | 7/1938 | Leighton | 280/661 |
| 2,198,544 | 4/1940 | Leighton | 280/661 X |
| 2,605,118 | 7/1952 | Booth et al. | 280/661 |
| 2,923,555 | 2/1960 | Kost et al. | 280/661 X |
| 3,163,441 | 12/1964 | Traugott | 280/661 |
| 3,342,507 | 9/1967 | Koch et al. | 280/661 X |
| 3,866,938 | 2/1975 | Boyd et al. | 280/661 |
| 3,917,308 | 11/1975 | Schulz | 280/661 X |
| 3,999,779 | 12/1976 | Bishop | 280/661 |
| 4,026,578 | 5/1977 | Mattson | 280/661 |
| 4,194,760 | 3/1980 | Shiomi et al. | 280/661 |
| 4,213,631 | 7/1980 | Wilkerson | 280/661 |
| 4,243,339 | 1/1981 | Dickerson | 280/661 X |
| 4,267,896 | 5/1981 | Hendriksen | 280/661 |
| 4,313,617 | 2/1982 | Muramatsu et al. | 280/661 |
| 4,420,170 | 12/1983 | Wysocki | 280/661 |
| 4,420,272 | 12/1983 | Ingalls et al. | 280/661 X |
| 4,424,984 | 4/1984 | Shiratori et al. | 280/661 |
| 4,530,512 | 7/1985 | Evlanov | 280/661 |
| 4,577,534 | 3/1986 | Rayne | 81/484 |
| 4,618,162 | 10/1986 | Specktor et al. | 280/661 |
| 4,706,987 | 11/1987 | Pettibone et al. | 280/661 |
| 4,718,691 | 1/1988 | Specktor et al. | 280/661 |
| 4,733,884 | 3/1988 | Pettibone et al. | 280/661 |
| 4,736,964 | 4/1988 | Specktor | 280/661 |
| 4,753,454 | 10/1988 | Woehler | 280/661 |
| 4,786,204 | 11/1988 | Mayeda | 411/398 |
| 4,817,984 | 4/1989 | Ferman et al. | 280/661 X |
| 4,863,187 | 9/1989 | Artz | 280/661 |

Primary Examiner—Charles A. Marmor
Assistant Examiner—Tamara L. Finlay
Attorney, Agent, or Firm—Haugen and Nikolai

[57] ABSTRACT

Camber adjustment assembly for adjustably and securely positioning a wheel within a vehicular suspension system utilizing a generally vertically arranged support strut with the lower end of the strut being provided with a generally "U"-shaped bracket secured fast thereupon. The bracket is typically provided with two vertically spaced apart bore pairs for receiving through-bolts therethrough, and for retaining the knuckle assembly therewithin. The camber adjustment assembly includes an eccentric bolt having an eccentric segment between the head portion and the distal portion, with the eccentric segment being designed to be retained within either the upper or lower series of bores formed in the knuckle assembly. An eccentric (offset) tough and durable sleeve is provided to be received over the eccentric segment of the bolt, with the sleeve having an inner diameter substantially equal to the outer diameter of the eccentric shank segment, and with the eccentric profile of the sleeve matching the eccentric profile of the eccentric bolt segment. The combination of the eccentric bolt and sleeve is arranged to be received within either the upper or lower vertically spaced apart series of bores in order to achieve secure and properly adjusted positioning of the knuckle assembly relative to the support strut.

6 Claims, 1 Drawing Sheet

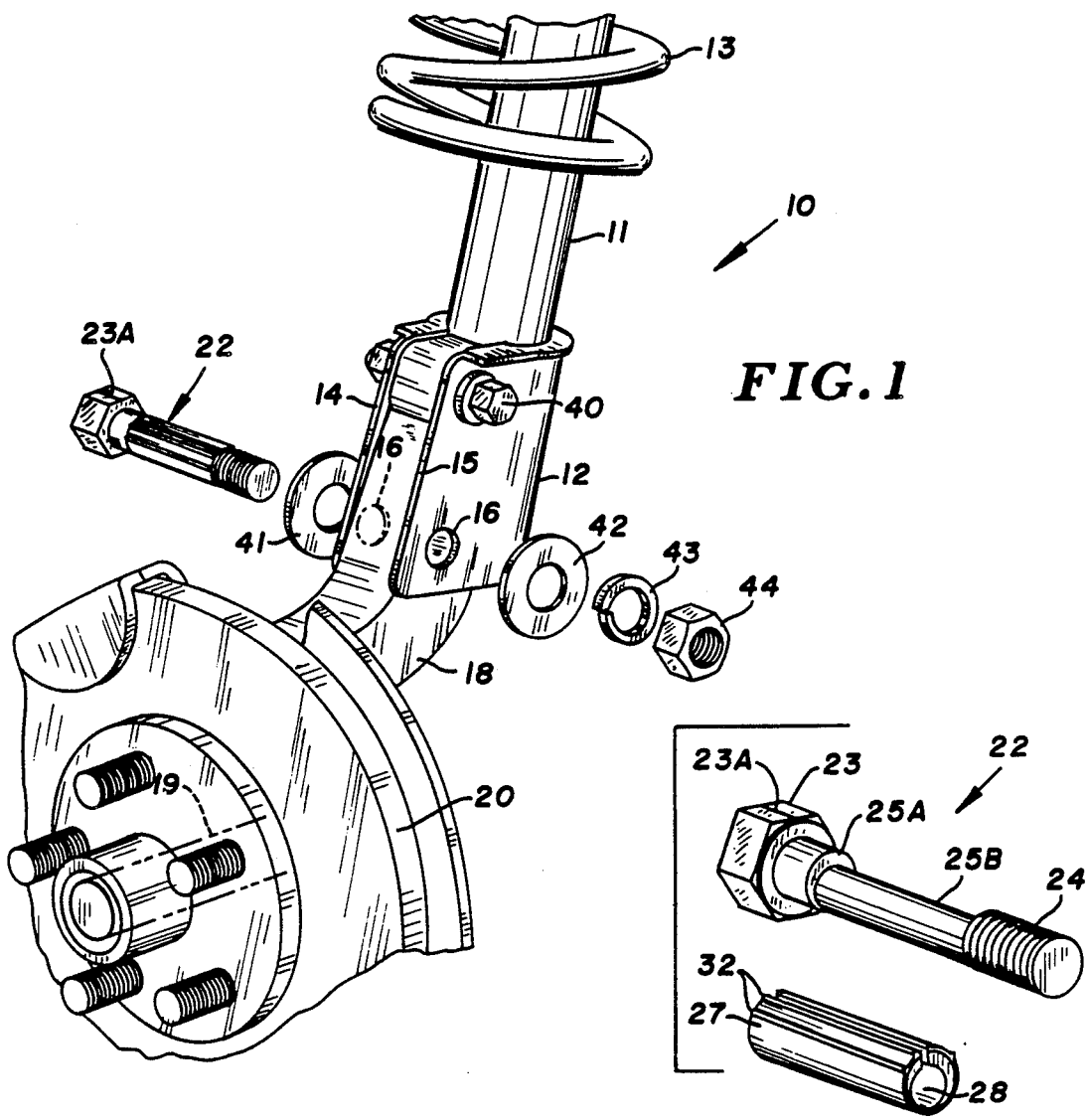

ALIGNMENT DEVICE FOR DOUBLE ECCENTRIC CAM ARRANGEMENT

BACKGROUND OF THE INVENTION

The present invention relates generally to an improved apparatus for repairing and/or restoring proper camber in vehicles having suspension systems which are essentially non-adjustable, and more specifically to a camber adjustment arrangement for such systems which securely positions a wheel assembly within the vehicular suspension system. The arrangement of the present invention is particularly adapted for use on that type of vehicle utilizing a generally vertically arranged support strut having a knuckle assembly secured to the lower end thereof. The adjustment arrangement of the present invention is particularly useful for on-vehicle servicing of non-adjustable suspension systems in the restoration of proper camber in and for the vehicle.

In the past, various devices have been designed for adjustably correcting camber in vehicles equipped with original non-adjustable suspension systems. These arrangements have included, for example, various eccentric means including bolts with radially projecting ears or other portions to achieve relative movement of components to achieve accurate adjustment. In other arrangements, bolts having eccentrically arranged cams which are secured to one end of a clamping bolt have been used. Additionally, a variety of other devices have been proposed and/or utilized for suspension systems in order to achieve camber correction, however most have required modification of the existing assembly, or may have been designed so as to create high stresses along localized areas or zones of portions of the suspension system.

SUMMARY OF THE INVENTION

The present invention provides a straightforward camming adjustment apparatus capable of significant dimensional adjustment and designed to adjust and correct camber in either a positive or negative direction Additionally, the apparatus of the present invention does not require any preparation or modification of the existing vehicle structure prior to use. Essentially, the apparatus of the present invention includes an eccentric bolt having a head portion, a threaded distal end portion concentric with the head portion, and a shank portion which includes an eccentric segment An eccentric sleeve having an offset or eccentrically disposed cylindrical bore extending through its length is arranged to fit snugly over the eccentric shank portion of the bolt The axial length of the offset sleeve is substantially equal to the axial length of the eccentric segment, and the sleeve has an eccentric profile substantially matching the eccentric profile of the center segment of the bolt.

Vehicular suspension systems of the type utilizing a generally vertically arranged support strut having a knuckle assembly secured to the lower end thereof typically utilize two through-bolts to secure the knuckle assembly to the strut. A generally "U"-shaped attachment member is secured fast to the lower end of the strut, with the legs of the "U" extending laterally outwardly as mounting flanges. The knuckle assembly is received between the flanges, and a pair of vertically spaced apart through-bores are utilized to secure the knuckle assembly between the flanges. The bolt and sleeve combination is arranged to be received within one or the other of the vertically spaced apart series of bores present on the suspension system to receive a through-bolt used to secure the knuckle assembly to the strut. In other words, the bolt and sleeve combination may be utilized in either the upper or lower of the vertically spaced apart series of bores. The arcuate disposition of the sleeve portion determines and/or achieves at least a portion of the camber adjustment, with the eccentric bolt being rotatably positionable within the leg flange bores for achieving or fine tuning the balance of the camber adjustment required. Inasmuch as the eccentric profiles between the bolt and the sleeve are matching, it is possible to adjust the arcuate positions of each in order to obtain a combination profile which matches, or is indeed identical, to that of a straight cylindrical bolt.

SUMMARY OF USE OF THE INVENTION

Briefly, and in accordance with the present invention, the eccentric or offset sleeve is inserted through the leg flange and into the knuckle bore, and when employed in the lower bore, the thicker portion of the eccentric (offset) sleeve faces inwardly to increase camber and outwardly to decrease camber. When inserted in the upper bore, the arrangement is reversed with the thicker portion of the eccentric sleeve facing inwardly to decrease camber and outwardly to increase camber. The eccentric bolt with the sleeve arranged thereon is passed through the series of bores. In order to slip the sleeve onto the eccentric bolt, an axial cut is made along the thick portion of the sleeve, to accommodate deflection or expansion of the sleeve. As indicated, the inner diameter of the bore passing through the eccentric (offset) sleeve is substantially equal to the diameter of the eccentric segment of the shank of the bolt.

The arrangement of the present invention renders it possible to provide on-vehicle replacement and/or adjustment of original non-adjustable suspension components in order to achieve and restore proper camber to the vehicular suspension system.

Therefore, it is a primary object of the present invention to provide an improved camber adjustment assembly for adjustably and securely positioning a vehicle wheel within a vehicular suspension system, and wherein appropriate and proper camber settings are achieved.

It is a further object of the present invention to provide a camber adjustment assembly for replacement of original non-adjustable suspension components in an automotive vehicle, and wherein the camber adjustment assembly of the present invention provides a firm, solid, and otherwise proper adjustment for vehicle suspension systems particularly for those vehicles of the type utilizing a generally vertically arranged support strut assembly.

It is still a further object of the present invention to provide an improved camber adjustment assembly for adjustably and securely positioning a vehicle wheel within a vehicular suspension system, particularly a suspension system of the type utilizing a generally vertically arranged support strut assembly with a generally "U"-shaped bracket secured on the lower end of the strut, and with the leg flanges of the bracket extending laterally outwardly of the support strut to secure and position a knuckle assembly including a vehicle wheel spindle means in a disposition providing proper camber positioning.

Other and further objects of the present invention will become apparent to those skilled in the art upon a study of the following specification, appended claims, and accompanying drawing

IN THE DRAWING

FIG. 1 is a perspective view of a portion of a vehicular suspension system including a generally vertically arranged support strut with a knuckle assembly secured thereto, and with portions of the wheel spindle being shown broken away, and with the camber adjustment assembly of the present invention being shown in exploded form relative to the bracket and knuckle assembly;

FIG. 2 is a perspective view of the eccentric bolt and eccentric sleeve components, with the sleeve being shown removed from the eccentric bolt;

FIG. 3 is a sectional view taken through the diameter of the eccentric bolt, and illustrating the spaced apart axes of the eccentric and cylindrical portions of the bolt;

FIG. 4 is a side elevational view of the eccentric bolt and eccentric sleeve combination, and with the sleeve portion being shown in two separate segments, one of which illustrates axial alignment between the sleeve and eccentric portions of the bolt, and with the other segment being shown in an arcuately rotated in a disposition providing maximum radial offset; and FIG. 5 is a front elevational view of a strut and knuckle assembly, with the leg flange portions of the strut being removed, so as to illustrate the adjustment achieved through rotation of the eccentric bolt, and illustrating in phantom the manner in which camber adjustment of the knuckle assembly is achieved through rotation of the eccentric bolt.

DESCRIPTION OF THE PREFERRED EMBODIMENT

In accordance with the preferred embodiment of the present invention, and with particular attention being directed to FIGS. 1 and 2 of the drawing, the vehicular suspension system portion generally designated 10 includes a strut member 11 arranged generally coaxially within coil spring member 13, and having secured thereto at its lower end a generally "U"-shaped bracket 12. Bracket 12 is secured fast upon the lower end of support strut 11, and, as indicated, is secured with the leg flanges 14 and 15 extending laterally outwardly of the strut 11. Additionally, the leg flanges of bracket 12 have holes formed therein as at 16—16 for receiving through-bolts therewithin. A second pair of holes is provided bracket 12 at the upper end thereof, with these holes being concealed from view in the arrangement illustrated in FIG. 1. In this situation, however, two vertically spaced apart pairs of bolt-receiving holes are provided in bracket 12 for receiving two vertically spaced apart bolts therewithin for securing and positioning a knuckle assembly relative to the support strut 11.

As previously indicated, and as illustrated in FIG. 1, knuckle assembly 18 includes a spindle means with a spindle shaft as shown in phantom at 19, for accommodating rotational movement of vehicle wheel assembly 20. In this manner, therefore, vehicle wheel assembly 20 is rotatably supported upon spindle 19, with the rockable positioning of knuckle assembly 18 determining the camber reading for wheel 20 when supporting the remainder of the vehicle thereon.

With continued attention being directed to FIGS. 1 and 2, eccentric bolt shown generally at 22 has a head portion 23 with a reference mark or other indexing indicia 23A thereon, along with a threaded distal end portion 24 concentric with head portion 23. Shank portions as at 25A and 25B are disposed between head portion 23 and threaded distal portion 24. As indicated in detail in FIG. 2, the shank portions of bolt 22 include a proximal head segment 25A concentric with head 23, and an eccentric segment 25B which is axially offset from the remaining portions of the bolt. As further indicated in FIGS. 1 and 2, bolt 22 is provided with an eccentric (offset) sleeve 27 for positioning upon and over eccentric portion or segment 25B of bolt 22.

As indicated in detail in FIG. 3, the axis of eccentric shank segment 25B is offset from the axis of the remaining portions of bolt 22, such as shown in detail in FIG. 3. Furthermore, the eccentric sleeve 27 is provided with a cylindrical bore as at 28 which extends through the length of sleeve 27, with the axis of bore 28 being along center point 29 of FIG. 3. The axis of the remaining portions of bolt 22 is along center point 30. The inner diameter of bore 28 is substantially equal to the outer diameter of eccentric segment 25B so as to provide a snug fit between sleeve 27 and eccentric segment 25B. In order to permit sleeve 27 to spread adequately to accommodate threaded end 24 during insertion, a longitudinal cut is provided in sleeve 27 as at 31, with this cut or slot being at and along the thickest portion of sleeve 27. Additionally, splines or ribs such as at 32—32 may be provided along the outer surface of sleeve 27. Splines or ribs 32—32 preferably extend along the entire axial length of sleeve 27, and are designed to improve the rigidity, durability, and placement of sleeve 27 within the suspension system.

With attention now being directed to FIG. 4 of the drawing, bolt 22 is shown with sleeve 27 in two separate segments as at 27A and 27B. In the sleeve disposition of illustrated at 27A, there is axial alignment between the eccentric segment 25B and sleeve 27 in the disposition illustrated at 27A. Also, as indicated, the eccentric profile of sleeve 27 matches the eccentric profile of center segment 25B relative to the remaining coaxial disposed segments so as to provide, in combination, a cylindrical composite structure. With respect to the sleeve segment shown in the disposition as at 27B, there is a maximum offset available, with the thick portion of sleeve 27 being disposed so that it is at the high point of eccentricity of eccentric shank segment 25B. Thus, in the disposition illustrated with sleeve segment 25B, maximum offset adjustment is provided, with the eccentricity of the shank segment 25B becoming additive to the eccentricity of sleeve 27.

With attention now being directed to FIG. 5 of the drawing, the indicated dispositions of knuckle assembly 18 are illustrated. By selective rotation of bolt 22, it is possible to adjust and move knuckle assembly 18 relative to strut 11 in a clockwise direction, as indicated by arrow 35. Conversely, arcuate rotation of bolt 22 may be utilized to adjust knuckle 18 in the counter-clockwise direction as indicated by arrow 36. The relative dispositions of knuckle 18 with respect to strut 11 are illustrated in phantom in FIG. 5 as at 37 and 38.

In actual operation, therefore, for restoration and/or adjustment of camber in the vehicle, a camber reading is initially taken in order to determine the amount of adjustment required In the description that follows, the means for receiving the lower strut bolt will be utilized for receiving and accommodating the adjustment arrangement of the present invention. Thereafter, the lower strut bolt, previously installed through bores 16—16, is removed. Thereafter, the eccentric bolt 22 along with its eccentric sleeve 27 is inserted into the bore formed in knuckle 18, as illustrated in FIG. 5 at 39. The thick portion of the eccentric (offset) sleeve 27 is directed or faced inwardly in order to increase camber, and outwardly in order to decrease camber. The angular disposition of sleeve 27 and bolt 22 is confirmed by observing the position of reference mark 23A. With bolt 22 and sleeve 27 positioned in the bore 39 formed in knuckle 18, adjustment of the camber is achieved. Appropriate washers are installed, as at 41, 42 and 43, and nut 44 is then securely tightened onto the threaded distal portion 24 of bolt 22. The wheel assembly and alignment heads are then re-installed, and the vehicle may be placed onto appropriate slip plates to permit wheels to be more accurately adjusted inwardly or outwardly to achieve a proper camber setting. As indicated, when the lower bolt-holes are being utilized for receiving bolt 22 and sleeve 27, in order to increase the camber setting, bolt 22 is turned clockwise to pull lower strut mount toward the center of the vehicle. Camber decrease is achieved by turning bolt 22 counter-clockwise to move the lower strut mount away from the center of the vehicle. The arrangement just described is reversed, however, when the upper hole arrangement is being utilized.

The eccentric bolt and sleeve combination is inserted into the series of bores in assembled disposition. This permits the eccentric sleeve and eccentric shank segment to be received within the knuckle bore 39 at that arcuate disposition wherein at least a portion of the camber adjustment is achieved. Thereafter, bolt 22 is rotatably positionable within the flange bores for contact between the concentric head and distal threaded portions and the inner periphery of the bores formed in the leg flanges. Thus, continued adjustable rotation of bolt 22 is utilized to achieve the balance of the camber adjustment required. Thus appropriate camber angle is achieved through combined eccentricities of the sleeve and the eccentric shank segment, while the system is retainably secured in place by securing nut 44 upon threaded segment 24.

For achieving appropriate performance of the components, sleeve 27 is preferably fabricated of nylon or other tough, durable, and long-lasting plastic or composite substance, and may, if desired, be reinforced with materials such as fiberglass or the like. Additionally, and as indicated hereinabove, sleeve 27 may be provided with a plurality of radially extending splines as at 32—32 to assure a tight fit between sleeve 27 and the interior of knuckle bore 39. Bolt 22 must be fabricated from high quality hardened steel, with a minimum Grade 8 bolt.

It will be appreciated that various modifications may be made in the structure as illustrated without departing from the spirit and scope of the present invention as set forth in the appended claims.

We claim:

1. In a camber adjustment assembly for adjustably and securely positioning a wheel within a vehicular suspension system of the type utilizing a generally vertically arranged support strut assembly with upper and lower ends and with a generally "U"-shaped bracket secured fast upon the lower end of said support strut with the leg flanges thereof extending laterally outwardly of said support strut and with the leg flanges of said "U"-shaped bracket having vertically spaced bores to receive two vertically spaced-apart bolts for securing and positioning a knuckle assembly including a vehicle wheel spindle shaft, a knuckle bore, and a support therefor to said support strut, said camber adjustment assembly comprising:

(a) an eccentric bolt having a head portion, a threaded distal end portion concentric with said head portion, and a shank portion disposed therebetween, said shank portion including a proximal head segment concentric with said head portion and a center segment, with said center segment having an axis eccentrically disposed relative to said head segment, and said head and distal threaded end portions;

(b) an eccentric sleeve having an eccentrically disposed cylindrical bore extending therethrough and with the inner diameter of said sleeve being substantially equal to the outer diameter of said eccentric center shank segment and with the axial length of said sleeve being substantially equal to the axial length of said eccentric center segment and that of said knuckle bore, said sleeve being arranged to be received over said eccentric center segment, and with said sleeve having an eccentric profile substantially matching the eccentric profile of said eccentric center segment relative to the remaining coaxially disposed segments;

(c) said eccentric bolt and sleeve combination being arranged to be received within at least one of said vertically spaced apart series of flange bores, with said eccentric sleeve and eccentric shank segment being received within said knuckle bore at that certain arcuate disposition for achieving at least a portion of the camber adjustment required relative to said leg flanges, and with said eccentric bolt being rotatably positionable within the said flange bores for contact between said concentric head and distal threaded portions and the inner periphery of said flange bores for achieving the balance of the camber adjustment required and for securing such adjustment upon tightening of a bolt onto said threaded end portion;

(d) the arrangement being such that the appropriate camber angle is achieved through the combined eccentricities of said eccentric sleeve and the eccentric shank segment of said eccentric bolt, and wherein said concentrically arranged head and distal threaded portions are adapted for retainably securing said knuckle assembly and wheel spindle shaft at said appropriate camber angle.

2. The camber adjustment assembly as defined in claim 1 wherein said eccentric sleeve is fabricated of nylon.

3. The camber adjustment assembly as defined in claim 2 wherein said eccentric sleeve is fabricated of nylon reinforced with fiberglass.

4. The camber adjustment assembly as defined in claim 2 being particularly characterized in that said eccentric bolt and sleeve combination is adapted to be received within the lower of the two vertically spaced apart flange bores for securing and positioning the knuckle assembly to the support strut.

5. The camber adjustment assembly as defined in claim 1 being particularly characterized in that the head portion of said eccentric bolt is provided with a reference indicia spaced from the center point thereof.

6. The camber adjustment assembly as defined in claim 1 being particularly characterized in that said eccentric sleeve is provided with a plurality of radially extending splines along the outer surface thereof.

* * * * *